United States Patent
Takahashi et al.

(10) Patent No.: US 11,176,672 B1
(45) Date of Patent: Nov. 16, 2021

(54) MACHINE LEARNING METHOD, MACHINE LEARNING DEVICE, AND MACHINE LEARNING PROGRAM

(71) Applicant: Shimadzu Corporation, Kyoto (JP)

(72) Inventors: Wataru Takahashi, Kyoto (JP); Shota Oshikawa, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 17/041,364

(22) PCT Filed: Jun. 28, 2018

(86) PCT No.: PCT/JP2018/024566
§ 371 (c)(1),
(2) Date: Sep. 24, 2020

(87) PCT Pub. No.: WO2020/003434
PCT Pub. Date: Jan. 2, 2020

(51) Int. Cl.
*G06K 9/46* (2006.01)
*G06T 7/11* (2017.01)
*G06N 3/02* (2006.01)
*G06N 20/00* (2019.01)

(52) U.S. Cl.
CPC .......... *G06T 7/11* (2017.01); *G06N 3/02* (2013.01); *G06N 20/00* (2019.01); *G06T 2207/20081* (2013.01); *G06T 2207/20084* (2013.01)

(58) Field of Classification Search
CPC combination set(s) only.
See application file for complete search history.

(56) References Cited

U.S. PATENT DOCUMENTS

| | | | |
|---|---|---|---|
| 2018/0012107 A1* | 1/2018 | Xu | G06K 9/6273 |
| 2019/0159737 A1* | 5/2019 | Buckler | G16H 30/40 |
| 2019/0311224 A1* | 10/2019 | Krishnan | G06K 9/627 |

OTHER PUBLICATIONS

Written Opinion by the International Search Authority (ISA 237) for PCT application No. PCT/JP2018/024566, dated Aug. 7, 2018, submitted with a machine translation.
Long et al., "Fully Convolutional Networks for Semantic Segmentation", The IEEE Conference on Computer Vision and Pattern Recognition, 2015, pp. 3431-3440.

* cited by examiner

*Primary Examiner* — Quan M Hua
(74) *Attorney, Agent, or Firm* — Muir Patent Law, PLLC

(57) ABSTRACT

A full-size training image is reduced by an image reduction unit (11) and input to an FCN (Fully Convolutional Neural Network) computation unit (13), and the FCN computation unit (13) performs calculation under a set filter coefficient and outputs a reduced label image. The reduced label image is enlarged to a full size by an image enlargement unit (14), the error calculation unit (15) calculates an error between the enlarged label image and a full-size ground truth based on a loss function, and the parameter update unit (16) updates a filter coefficient depending on the error. By repeating learning under the control of the learning control unit 17, it is possible to generate a learning model for performing optimal segmentation including an error generated at the time of image enlargement. Further, by including the image enlargement processing in the learning model, a full-size label image can be output, and the accuracy evaluation of the model can also be performed with high accuracy.

4 Claims, 2 Drawing Sheets

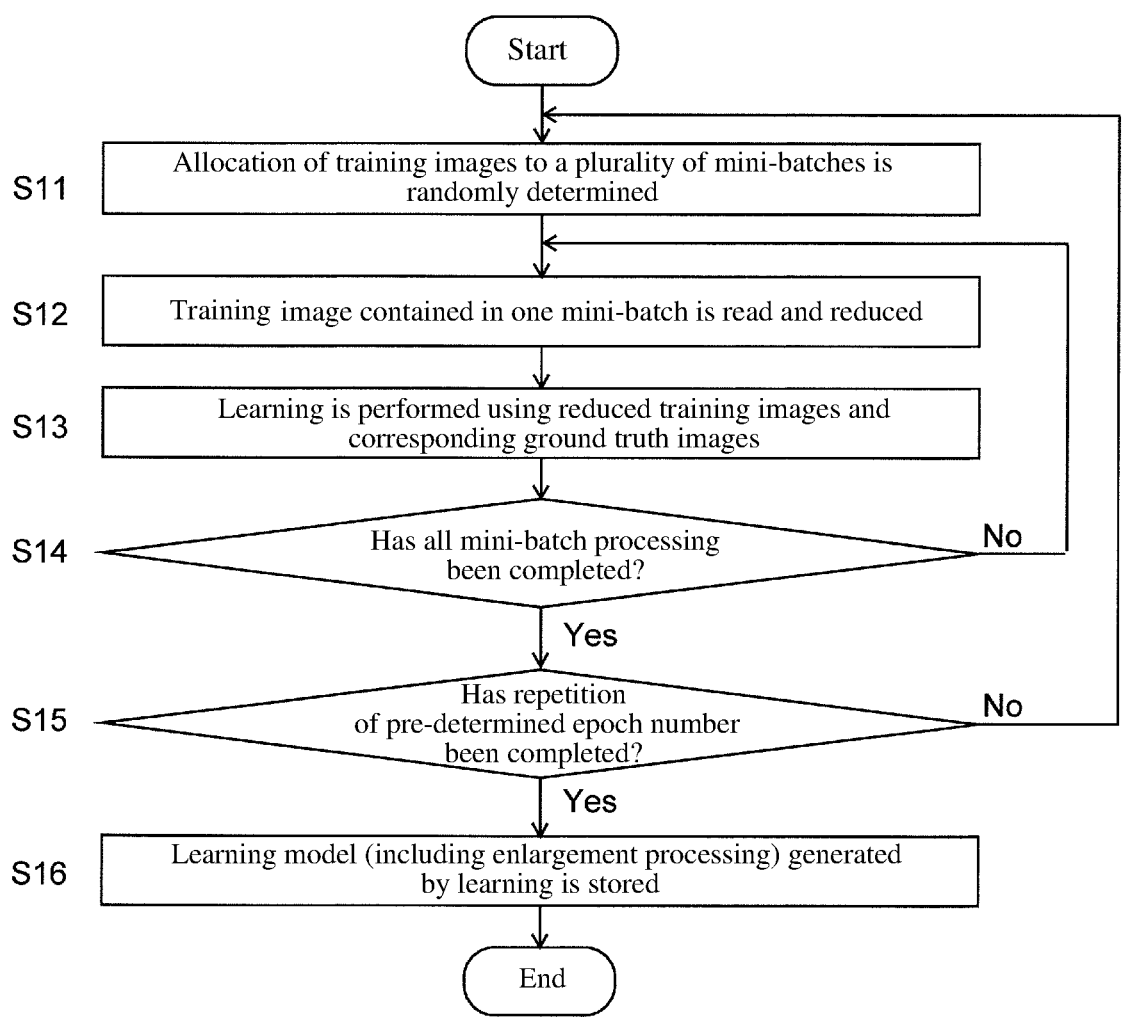

MACHINE LEARNING METHOD, MACHINE LEARNING DEVICE, AND MACHINE LEARNING PROGRAM

TECHNICAL FIELD

The present invention relates to a machine learning method and, a machine learning device, and more particularly, to a machine learning method and a machine learning device for generating a learning model for performing semantic segmentation on an image by supervised machine learning.

BACKGROUND ART

In recent years, in various fields of, e.g., automatic operation and medical image diagnosis, image processing techniques, such as, e.g., semantic segmentation using machine learning, in particular, deep learning, have been used. In the image processing using deep learning, a convolutional neural network (hereinafter abbreviated as "CNN") has been widely used. The CNN usually includes a convolutional layer that extracts features of an image by convolution processing by a plurality of filters, a pooling layer that gives position invariance of local data by pooling processing that aggregates responses in a certain region, and a fully connected layer that connects image data whose features are extracted by the convolution layer and the pooling layer to one node and outputs values (feature variables) transformed by an activation function. Recently, a fully convolution neural network (hereinafter abbreviated as "FCN") in which a fully connected layer constituting the CNN is replaced with a convolutional layer has been proposed (see Non-Patent Document 1), and in particular, applications in semantic segmentation have been progressed.

In any case, in the machine learning including the above-described CNN and FCN, generally, a model function f (w, x) is constructed using a parameter w for input data x, and a loss for the previously prepared correct answer data in the model function is defined, and an appropriate model function is acquired by modifying the parameter w so as to minimize the loss. Such a method is well known as back propagation. In semantic segmentation, the above-described correct answer data denotes data constituting a label image that is a result of correctly segmenting an input image.

In general, in deep learning for image data, the calculation amount becomes enormous. Therefore, the input image data is normally processed by a GPU (Graphics Processing Unit) designed specifically for image computation processing. However, even in this case, since it is difficult to process a large number of images at a time, processing is performed in which an input image is segmented into a predetermined number of images and a loss function is calculated for each group of the segmented images. The number of images of the group is collectively called a batch size and is preset as an important parameter in machine learning.

Increasing the batch size enhances the learning and the learning can be performed efficiently, but there is a limitation on a configurable batch size due to the restriction of a memory capacity of a GPU. Further, when the size of the input image is extremely large, even if the batch size is set to a minimum value, the data size required for learning may sometimes exceed the memory capacity of the GPU and processing may not be executed. For example, in PCT/JP2018/008483 and PCT/JP2018/009046, the applicants of the present application have proposed a method of identifying undifferentiated deviated cells generated in the course of culturing pluripotent stem cells by applying machine learning to a cell observation image acquired by a holographic microscope. In such a case, since the original cell observation image is very high in definition and wide in photographing range, the size of the image data is enormous, so that the temporary memory size used at the time of the learning becomes enormous. Therefore, the data size required for learning one image may sometimes exceed the memory capacity of the GPU.

Under the circumstances, conventionally, in order to increase the batch size as much as possible or to process an image having an extremely large data size, a method is adopted in which an input image and its corresponding ground truth are reduced in size in the same manner, and learning is performed using the reduced images. As the image reduction algorithm, a bilinear interpolation, a bicubic interpolation, a nearest neighbor algorithm, a Lanczos interpolation, and the like are known.

PRIOR ART DOCUMENT

Non-Patent Document

Non-Patent Document 1: Jonathan Long and two others, "Fully Convolutional Networks for Semantic Segmentation", The IEEE Conference on Computer Vision and Pattern Recognition, 2015, pp. 3431-3440 (Internet)

SUMMARY OF THE INVENTION

Problems to be Solved by the Invention

However, the above-described conventional machine learning method has the following problems. In machine learning, generally, after a learning model is generated by learning using a training image and a ground truth, the accuracy evaluation of whether or not the learning model is appropriate is performed. At the time of the accuracy evaluation of the learning model, a test image and its corresponding ground truth are used, and a label image output from the learning model as a result of inputting the test image to the learning model is a reduced image. Therefore, the reduced label image is enlarged by a bilinear interpolation or the like to return to the same full-size image as the ground truth, and both the images are compared and evaluated. However, due to the error of the pixel signal occurring when enlarging the reduced label image, the difference in the fine region between both the images becomes apparent, so the evaluation accuracy may sometimes be reduced.

The present invention has been made in order to solve the above-mentioned problems, and an object thereof is to provide a machine learning method and a machine learning device capable of generating a learning model capable of outputting a full-size high accuracy label image even when an input image is large in size and therefore the image needs to be reduced in size at the time of learning.

Means for Solving the Problem

A machine learning method according to the present invention made to solve the above-described problem is a machine learning method for generating a machine learning model adapted for semantic segmentation on an input image, the machine learning method comprising:

a) an image reduction step of reducing a size of an input training image; and b) a learning execution step, the learning execution step including repeatedly performing the following:

a label image generation step of generating a label image using a learning model based on predetermined parameters from a plurality of reduced training images;

an image enlargement step of enlarging the label image to have a size corresponding to that of the input training image; and a parameter update step of acquiring an error due to a loss function based on the enlarged label image and on a ground truth image corresponding to the training image, thereby updating the parameter depending on the error, resulting in gradual improvement of the learning model, wherein an enlarged learning model, in which enlargement processing by the image enlargement step is added to the learning model that has undergone the improvement in the learning execution step, is acquired for a learning model adapted for performing semantic segmentation.

Further, a machine learning device according to the present invention made to solve the above-described problem is a machine learning device for generating a machine learning model adapted for semantic segmentation on an input image, the machine learning device comprising:

a) an image reduction unit configured to reduce a size of an input training image; and b) a learning execution unit including a label image generation unit configured to generate a label image using a learning model based on predetermined parameters from a plurality of reduced training images, an image enlargement unit configured to enlarge the label image to have a size corresponding to that of the input training image, a parameter update unit configured to acquire an error due to a loss function based on the enlarged label image and on a ground truth image corresponding to the training image, thereby updating the parameter depending on the error, and a repetition control unit configured to gradually improve the learning model by repeatedly performing processing of each of the label image generation unit, the image enlargement unit, and the parameter update unit, wherein an enlarged learning model, in which enlargement processing by the image enlargement unit is added to the learning model that has undergone the improvement by the learning execution unit, is acquired for a learning model adapted for semantic segmentation.

In the machine learning method according to the present invention, the method and the algorithm are not specifically limited as long as semantic segmentation of an image can be performed based on a learning model. The machine learning method is exemplified by a support vector machine (SVM), a Random Forest, and an AdaBoost, as well as the above-described deep learning method including FCN and CNN.

In the present invention, as an image for generating a learning model, a plurality of (usually a fairly large number of) sets of a training image and a ground truth of the same size (full size) are input. The ground truth is a label image that is the result of the exact semantic segmentation performed on the training image. In the machine learning method according to the present invention, first, an input full-size training image is reduced to a predetermined size in an image reduction step. The image reduction algorithm is not particularly limited, and any one of the methods including the above-mentioned several methods may be used.

In the learning execution step, by performing machine learning using a plurality of training images reduced as described above, a learning model for performing semantic segmentation on an unknown image is generated. For example, when performing deep learning by FCN, in the label image generation step, a label image is generated by a multilayer network including a plurality of convolutional layers with coefficients (weights) of filters as parameters and a plurality of pooling layers, and first, a label image is generated by a multilayer network including a convolutional layer in which the coefficient of the filter is set to predetermined values. Since the input image to the network is a reduced image, the label image output from the network is also a reduced label image.

In the image enlargement step, the reduced label image is enlarged to a size of the original training image, i.e., to the full size. Then, in the parameter update step, an error is acquired from the full-size label image after enlargement and the ground truth of the same full-size as that of the enlarged full-size label image by using a predetermined loss function, and the parameters, that is, the filter coefficient of the convolutional layer, is updated depending on the error. Then, the label image is generated again by the multilayer network in which the filter coefficient is updated, and the label image is enlarged to acquire the error between the label image and the ground truth. The processing is repeated. With this repetition, the filter coefficient group, or the learning model, is sequentially improved to approach a more accurate model. Then, an enlarged learning model in which the enlargement processing in the image enlargement step is added to the final learning model is acquired as a learning model for performing semantic segmentation.

In the present invention, learning including the enlargement processing in the image enlargement step is performed, so that the parameter of the learning model is determined so as to minimize the errors, etc., of the pixel signal that may occur during the enlargement processing. In a learning model generated by a conventional learning method, the label image output to the input test image is a reduced image, whereas, in the learning model generated by the present invention, the output label image is an image of the same full size as the input test image. Therefore, the accuracy evaluation of a learning model can be performed using a label image output from the learning model and a full-size ground truth as they are.

Effects of the Invention

As described above, according to the present invention, since learning can be performed by reducing the size of the input image, the batch size can be increased, or an image whose image size is extremely large can also be processed. On the other hand, since the label image output from the learning model is not a reduced image but a high-definition image of the same full size as the original input image, the accuracy evaluation of the learning model can be performed, for example, with high accuracy.

BRIEF DESCRIPTION OF THE DRAWINGS

FIG. 3 is a flowchart showing a flow of processing at the time of learning in the machine learning device of the example.

EMBODIMENTS FOR CARRYING OUT THE INVENTION

Hereinafter, an example of a machine learning method, a machine learning device, and a machine learning program according to the present invention will be described with reference to the attached drawings.

Figure 1:
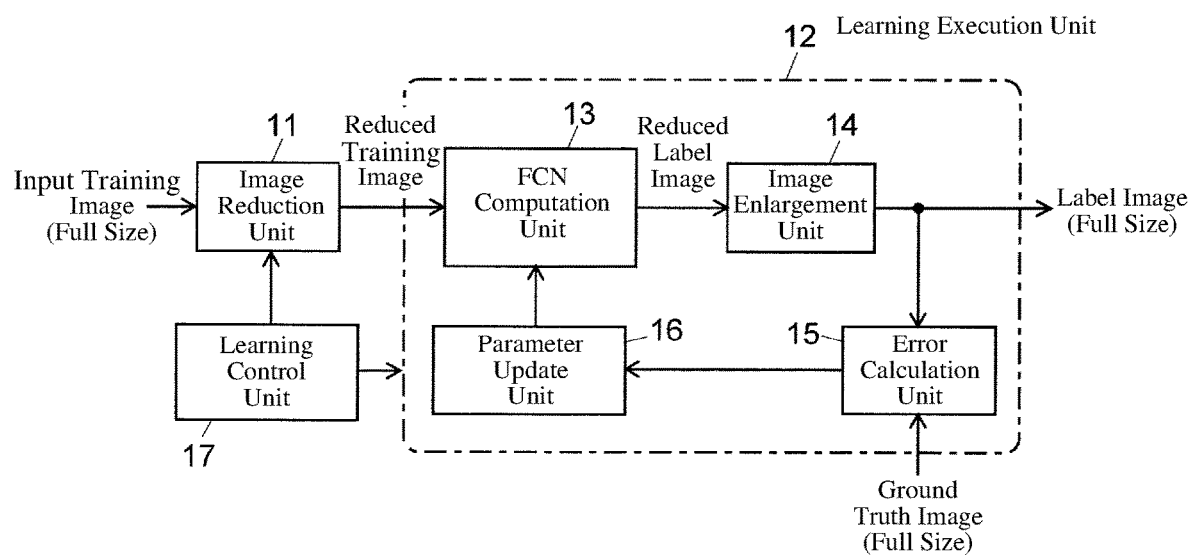
FIG. 1 is a block diagram of an example of a machine learning device according to the present invention.

FIG. 1 is a schematic block diagram of an example of a machine learning device for performing a machine learning method according to the present invention.

The machine learning device of this example includes, as functional blocks, an image reduction unit 11, a learning execution unit 12 including an FCN computation unit 13, an image enlargement unit 14, an error calculation unit 15, and a parameter update unit 16, and a learning control unit 17. Note that, this machine learning device may be embodied by making a computer system including a personal computer or a higher performance workstation, or a high-performance computer connected to such a computer via a communication line as a hardware resource and executing software installed on such a computer unit or a computer system.

Figure 2:
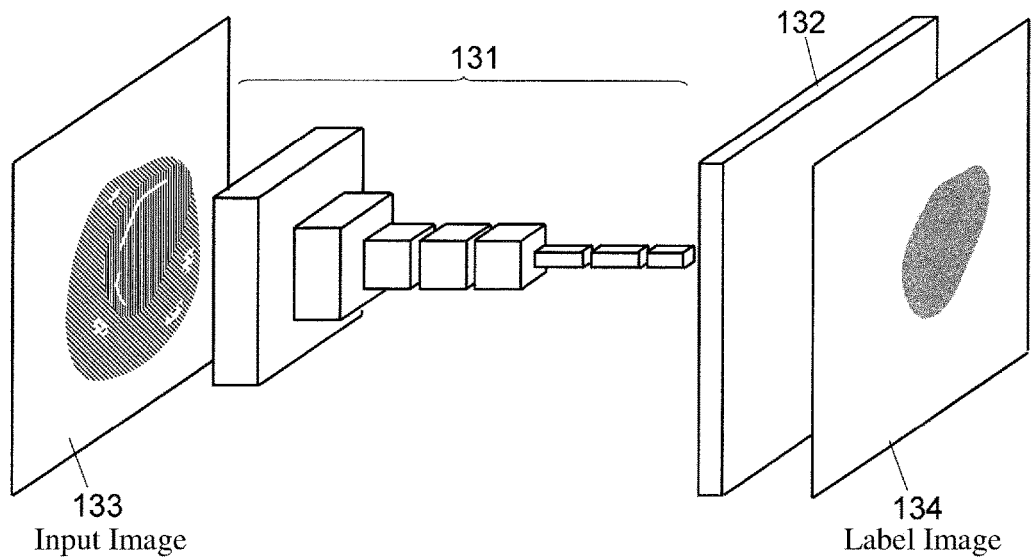
FIG. 2 is a conceptual diagram of a construction of an FCN computation unit in the machine learning device of this example.

FIG. 2 is a conceptual diagram of the structure of the FCN computation unit 13. The structural and processing of an FCN are detailed in many documents including Non-Patent Document 1. It may also be implemented using commercially available or free software such as "MATLAB" provided by MathWorks, USA. For this reason, the schematic description of the structure and processing by the FCN computation unit 13 will be given here.

As shown in FIG. 2, the FCN includes, for example, a multilayer network 131 in which a convolutional layer and a pooling layer are repeatedly multilayered, and a convolutional layer 132 corresponding to a fully connected layer in a convolutional neural network. In this instance, in the multilayer network 131, convolution processing using a filter (kernel) having a predetermined size and pooling processing for two-dimensionally reducing the convolution result and extracting a valid value is repeated. Note that the multilayer network 131 may be configured only by a convolutional layer without pooling layers. Further, in the final stage convolutional layer 132, local convolution and deconvolution are performed while sliding a filter having a predetermined size within the input image. In the FCN, the labeled label image 134 can be output by performing semantic segmentation on the input image 133.

In order to perform the segmentation by the FCN, it is necessary to learn coefficients (weights) of filters in a plurality of convolution layers included in the multilayer network 131 and the final convolutional layer 132 in advance using a large number of training images. Next, the operation when learning is performed in the machine learning device of this example will be described with reference to the flowchart shown in FIG. 3. In this case, learning is performed using a stochastic gradient descent method, which is generally often used in machine learning. This method is a method of repeating learning while dividing a given large number of learning data by a predetermined mini-batch unit and has an advantage that the learning data is shuffled randomly, so that it becomes difficult to fit into a localized solution.

At the time of learning, a large number of set images are used. Each set is composed of a training image that is a target of segmentation and a ground truth that is a label image as a result of the appropriate segmentation of the training image.

The learning control unit 17 randomly determines training images to be allocated to a plurality of mini-batches according to predetermined batch sizes (Step S1). Here, it is supposed that the number of mini-batches is N and the number of training images allocated to one mini-batch is n.

The image reduction unit 11 reads n pies of training images included in one mini-batch in accordance with the allocation determined by the learning control unit 17 and reduces the size of each image to a predetermined size. Next, the learning execution unit 12 executes learning of the FCN based on the plurality of reduced training images and ground truths respectively corresponding to the original training images (Step S13).

More specifically, first, under the filter coefficient initially set by the parameter update unit 16, the FCN computation unit 13 performs processing on the input image and outputs a label image as a result of segmentation. Since the input image is a reduced image, the label image to be output is also a reduced image. The image enlargement unit 14 enlarges the size of each of the plurality of label images to the same full size as the original training image. The error calculation unit 15 calculates an error due to a predetermined loss function based on the enlarged label image and its corresponding ground truth. That is, when this error is calculated, both of the label image and the ground truth are full-size images. The parameter update unit 16 updates the filter coefficient in the FCN computation unit 13 based on the calculated error. As a result, the result of the processing in the FCN computation unit 13 for the same input image, that is, the label image changes. The learning control unit 17 learns the filter coefficient of the FCN computation unit 13 based on one mini-batch by repeating such a routine until, for example, the error falls within a predetermined allowable range. That is, the filter coefficient of the FCN computation unit 13 is learned by back propagation.

Thereafter, the learning control unit 17 determines whether or not the learning has been completed for all the mini-batches (Step S14). When it is determined as NO in Step S14, the process returns to Step S12 because some of the plurality of mini-batches for which the allocation of the training images has been determined in Step S11 have not yet been learned. Under the control of the learning control unit 17, the image reduction unit 11 reads and reduces a training image included in another one mini-batch. Thus, the process of Steps S12 to S14 is repeated for the number N of the mini-batches.

When it is determined as YES in Step S14, the learning control unit 17 determines whether or not the process of Step S11 has been repeated by a predetermined number of epochs (Step S15). When it is determined as NO in Step S15, the process returns from Step S15 to Step S11, and the learning control unit 17 randomly determines training images to be allocated to a plurality of mini-batches. Therefore, the training image to be allocated to each mini-batch will be shuffled. The number of epochs is appropriately determined in advance, but is usually a large value, for example, 1,000 times or 10,000 times. That is, the processing of Step S11 to Step S15 is repeated by the number of epochs, and the filter coefficient of the FCN computation unit 13 is learned in the course of the repetition. When it is determined as YES in Step S15, the learning is finished. Then, the learning result is stored as a learned model (Step S16).

As described above, the loop for learning the filter coefficient of the FCN computation unit 13 includes the enlargement processing in the image enlargement unit 14. Usually, in the enlargement processing, processing opposite to the reduction processing is performed, but It is inevitable that errors will occur in the pixel signals generated by interpolation. To the contrary, in the machine learning device of this example, a learning model by the FCN, including errors that occur when the image is enlarged, is generated. Therefore, the learning model generated here is a model including the enlargement processing in the image enlargement unit 14. That is, the enlargement learning model in which the FCN and the enlargement processing for enlarging the label image which is the output of the FCN are combined is a learning model for performing semantic segmentation on the input image, and the output of the learning model is a full-size label image.

As a result, for example, when the accuracy of the generated learning model is evaluated using the test image, high-accuracy evaluation can be performed using the full-size label image output to the input test image and the full-size ground truth corresponding to the test image.

In the above-described example, the FCN is used as a machine learning method for semantic segmentation, but it is obvious that the FCN may be an ordinary CNN. Further, the present invention is effectively applied not only to a machine learning method using a neural network but also to a machine learning method capable of performing segmentation of an image. As such a machine learning method, a support vector machine, a random forest, and an AdaBoost can be exemplified.

Further note that the above-described example is merely an example of the present invention, and it is apparent that the present claims encompass further modifications, changes, and additions performed appropriately within the spirit of the present invention.

DESCRIPTION OF SYMBOLS

11: Image reduction unit
12: Learning execution unit
13: FCN computation unit
131: Multilayer network
132: Convolutional layer
14: Image enlargement unit
15: Error calculation unit
16: Parameter update unit
17: Learning control unit

The invention claimed is:

1. A machine learning method for generating a machine learning model adapted for semantic segmentation on an input image, the machine learning method comprising:
   a) an image reduction step of reducing a size of an input training image; and
   b) a learning execution step, the learning execution step including repeatedly performing the following:
   a label image generation step of generating a label image using a learning model based on predetermined parameters from a plurality of reduced training images;
   an image enlargement step of enlarging the label image to have a size corresponding to that of the input training image; and
   a parameter update step of acquiring an error due to a loss function based on the enlarged label image and on a ground truth image corresponding to the training image, thereby updating the parameter depending on the error, resulting in gradual improvement of the learning model,
   wherein an enlarged learning model, in which enlargement processing by the image enlargement step is added to the learning model that has undergone the improvement in the learning execution step, is acquired for a learning model adapted for performing semantic segmentation.

2. The machine learning method as recited in claim 1, wherein the machine learning is deep learning using a convolutional neural network.

3. A machine learning device for generating a machine learning model adapted for semantic segmentation on an input image, the machine learning device comprising:
   a) an image reduction unit configured to reduce a size of an input training image; and
   b) a learning execution unit including a label image generation unit configured to generate a label image using a learning model based on predetermined parameters from a plurality of reduced training images, an image enlargement unit configured to enlarge the label image to have a size corresponding to that of the input training image, a parameter update unit configured to acquire an error due to a loss function based on the enlarged label image and on a ground truth image corresponding to the training image, thereby updating the parameter depending on the error, and a repetition control unit configured to gradually improve the learning model by repeatedly performing processing of each of the label image generation unit, the image enlargement unit, and the parameter update unit,
   wherein an enlarged learning model, in which enlargement processing by the image enlargement unit is added to the learning model that has undergone the improvement by the learning execution unit, is acquired for a learning model adapted for semantic segmentation.

4. The machine learning device as described in claim 3, wherein the machine learning is deep learning using a convolutional neural network.

* * * * *